United States Patent
Shiimoto et al.

(10) Patent No.: US 8,824,103 B2
(45) Date of Patent: Sep. 2, 2014

(54) MAGNETIC RECORDING HEAD AND MAGNETIC RECORDING APPARATUS

(75) Inventors: Masato Shiimoto, Odawara (JP); Kenji Sugiura, Odawara (JP); Mikito Sugiyama, Odawara (JP); Isao Nunokawa, Odawara (JP); Yo Sato, Odawara (JP); Katsuro Watanabe, Hitachiota (JP); Kazuhiko Hosomi, Fujisawa (JP); Nobuo Yoshida, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/404,029

(22) Filed: Feb. 24, 2012

(65) Prior Publication Data

US 2013/0057980 A1 Mar. 7, 2013

(30) Foreign Application Priority Data

Sep. 6, 2011 (JP) ................................ 2011-193495

(51) Int. Cl.
  *G11B 5/127* (2006.01)
  *G11B 5/35* (2006.01)
  *G11B 5/235* (2006.01)

(52) U.S. Cl.
  USPC ............. 360/125.3; 360/125.1; 360/125.13; 360/125.19; 360/119.03

(58) Field of Classification Search
  CPC .......... G11B 2005/0024; G11B 5/314; G11B 5/1278; G11B 5/3146; G11B 5/3116; G11B 5/315; G11B 5/127; G11B 5/23
  USPC ............. 360/125.13, 125.1, 125.19, 125.3, 360/119.03
  See application file for complete search history.

(56) References Cited

U.S. PATENT DOCUMENTS

| 7,791,829 | B2 * | 9/2010 | Takeo et al. ..................... 360/55 |
| 8,120,875 | B2 * | 2/2012 | Takagishi et al. ........ 360/125.31 |
| 8,159,781 | B2 * | 4/2012 | Taguchi et al. ............ 360/125.3 |
| 8,320,079 | B2 * | 11/2012 | Iwasaki et al. ................ 360/128 |
| 2004/0240110 | A1 | 12/2004 | Matono |

(Continued)

FOREIGN PATENT DOCUMENTS

| JP | 62-57111 | 3/1987 |
| JP | 2004-335032 | 11/2004 |

(Continued)

OTHER PUBLICATIONS

Yiming Wang et al., Media damping constant and performance characteristics in microwave assisted magnetic recording with circular ac field, Journal of Applied Physics, 105, 07B902, 2009.

(Continued)

*Primary Examiner* — Will J Klimowicz

(74) *Attorney, Agent, or Firm* — Antonelli, Terry, Stout & Kraus, LLP.

(57) ABSTRACT

The strength of a magnetic field applied from a main pole to an oscillator and the strength of a magnetic field applied from the main pole to a recording medium are improved in a magnetic recording head for microwave assisted recording. In the magnetic recording head according to the present invention, an interval between the main pole and a trailing shield at a place in a position above an air bearing surface is larger than an interval between the main pole and the trailing shield on the air bearing surface.

5 Claims, 9 Drawing Sheets

(56) References Cited

U.S. PATENT DOCUMENTS

| | | |
|---|---|---|
| 2005/0023938 A1 | 2/2005 | Sato et al. |
| 2009/0059417 A1 | 3/2009 | Takeo et al. |
| 2010/0027158 A1 | 2/2010 | Takagishi et al. |
| 2010/0134922 A1* | 6/2010 | Yamada et al. .......... 360/123.01 |
| 2010/0195247 A1 | 8/2010 | Mochizuki et al. |
| 2011/0222185 A1* | 9/2011 | Roppongi et al. .............. 360/59 |
| 2012/0113543 A1* | 5/2012 | Shiimoto et al. ................ 360/75 |
| 2012/0134046 A1* | 5/2012 | Matsumoto et al. ....... 360/99.08 |
| 2012/0275061 A1* | 11/2012 | Takagishi et al. ......... 360/123.05 |
| 2013/0050869 A1* | 2/2013 | Nagasaka et al. ............... 360/75 |

FOREIGN PATENT DOCUMENTS

| | | |
|---|---|---|
| JP | 2005-25831 | 1/2005 |
| JP | 2009-64499 | 3/2009 |
| JP | 2009301695 A * | 12/2009 |
| JP | 2010003351 A * | 1/2010 |
| JP | 2010020857 A * | 1/2010 |
| JP | 2010-40060 | 2/2010 |
| JP | 2010040059 A * | 2/2010 |
| JP | 2010-182361 | 8/2010 |
| JP | 2010-257539 | 11/2010 |
| JP | 2011118958 A * | 6/2011 |

OTHER PUBLICATIONS

Jian-Gang Zhu et al., Microwave Assisted Magnetic Recording, IEEE Transactions on Magnetics, Jan. 2008, pp. 125-131, vol. 44, No. 1.

* cited by examiner

|  | Structure A Example of present invention | Structure B Conventional example | Structure C |
|---|---|---|---|
| θ | 45 | 0 | 40 |
| DB (nm) | 25 | - | 200 |
| Hgap (kOe) | 11.5 | 10.0 | 11 |
| Hme (kOe) | 11.0 | 10.0 | 10 |

(a)

Medium rotation direction (TR)

(b) (Prior Art)

Medium rotation direction (TR)

MAGNETIC RECORDING HEAD AND MAGNETIC RECORDING APPARATUS

CLAIM OF PRIORITY

The present application claims priority from Japanese patent application JP 2011-193495 filed on Sep. 6, 2011, the content of which is hereby incorporated by reference into this application.

BACKGROUND OF THE INVENTION

1. Field of the Invention

The present invention relates to a magnetic recording head having a function of inducing magnetization reversal by applying a high frequency field to a magnetic recording medium.

2. Background Art

In recent years, recording density of a magnetic recording/reading device such as a hard disk drive (HDD) has been requested to increase as fast as 40% per year. The surface recording density is expected to reach 1 Tbits/inch$^2$ by the year 2013.

To improve the surface recording density, it is required to miniaturize a magnetic recording head and reading head and reduce the particle size of a magnetic recording medium. However, the write field strength is reduced by miniaturization of the magnetic recording head, which may cause insufficient recording capability. Also, the influence of thermal fluctuation becomes considerable by reducing the particle size of the magnetic recording medium. Accordingly, it is required to increase the coercivity and the anisotropic energy when reducing the particle size of the magnetic recording medium, which is difficult in practice. Thus, improvement of the recording capability is the key to improvement of the surface recording density.

To address this problem, an assisted recording technique, in which heat or a high frequency field is applied to temporarily reduce a coercivity of a magnetic recording medium only when recording information, has been suggested.

An assisted recording technique of applying a high frequency field is referred to as "microwave assisted magnetic recording" (MAMR) and receives much attention recently. In MAMR, a high frequency field in high microwave bands is applied to a nanometer region to locally excite a recording medium and reduce a magnetization switching field for recording information. Since the magnetic resonance is used according to this technique, using a strong high frequency field having a frequency that is proportional to the anisotropy field of the recording medium is required to sufficiently reduce the magnetization switching field.

JP Patent Publication (Kokai) No. 2005-025831A discloses a high frequency oscillator that sandwiches a laminated film, which is structured similarly to a GMR device (giant magneto resistive device), between electrodes for generating a high frequency assisted magnetic field. The high frequency oscillator can generate a tiny high frequency oscillation magnetic field by injecting a conduction electron having spin fluctuation generated in a GMR structure into a magnetic material via a nonmagnetic material.

JP Patent Publication (Kokai) No. 2010-257539A and JP Patent Publication (Kokai) No. 2010-182361A disclose a structure in which an interval between a main pole and an oscillator at a position above an air bearing surface is larger than that on the air bearing surface. By reducing a magnetic field applied to the oscillator from the main pole, the oscillator easily oscillates and loss of write field strength is reduced.

"Microwave Assisted Magnetic Recording", J-G. Zhu et. al, IEEE trans. Magn., Vol. 44, No. 1, pp. 125 (2008) discloses a technique of recording information on a magnetic recording medium having a large magnetic anisotropy by providing a field generation layer (FGL) that rapidly rotates as a result of spin-torque near a magnetic recording medium adjacent to a main pole of a vertical magnetic head and generating a microwave (high frequency field).

"Medium damping constant and performance characteristics in microwave assisted magnetic recording with circular as field", Y. Wang et. al, Journal of Applied Physics, Vol. 105, pp. 07B902 (2009) discloses a technique of effectively assisting magnetization reversal of a magnetic recording medium by providing an oscillator between a main pole of a magnetic recording head and a shield on a rear side of the main pole (trailing side) and changing a rotational direction of a high frequency field depending on a polarity of a write field.

SUMMARY OF THE INVENTION

To provide the recording density of 1 Tbits/inch$^2$ in MAMR, it is required to radiate a strong high frequency field to a nanometer region to locally resonate a magnetic recording medium magnetically and reduce a magnetization switching field for recording information. To achieve above, an oscillator needs to oscillate in a high frequency field generated from a main pole and apply a large magnetic field to a recording medium from the main pole, so as to allow the oscillator to generate a strong high frequency field.

In MAMR, the oscillator needs to have the reversal speed that is fast enough to be synchronized with a recording polarity. As the result from recording/reading simulations carried out by changing the strength of the magnetic field applied to the oscillator, it has found that the strength of the magnetic field applied from the main pole to the oscillator should be high for recording high-quality signals.

When the strength of the magnetic field applied from the main pole to the oscillator is increased to a certain extent, a magnetic field necessary for assisted recording can be obtained even though the strength of the high frequency field generated from the oscillator is decreased. On the other hand, when the strength of the magnetic field applied from the main pole to the oscillator is reduced, reversal of magnetization of the oscillator is not finished in a bit cycle so that the high frequency field assist becomes impossible. Thus, applying the high write field to the oscillator is extremely important for improving the reversal speed.

An object of the present invention, which has been made to solve the problems as stated above, is to improve the strength of a magnetic field applied from a main pole to an oscillator and improve the strength of a magnetic field applied from the main pole to a recording medium in a magnetic recording head for microwave assisted recording.

In the magnetic recording head according to the present invention, an interval between the main pole and a trailing shield at a place in a position above an upper end portion of the oscillator is larger than an interval between the main pole and the trailing shield on an air bearing surface.

By using the magnetic recording head according to the present invention, a high frequency field can be applied from the main pole to both the magnetic recording medium and the oscillator. Thus, a magnetic recording apparatus with high recording density can be provided.

DETAILED DESCRIPTION OF THE PREFERRED EMBODIMENTS

Figure 1:
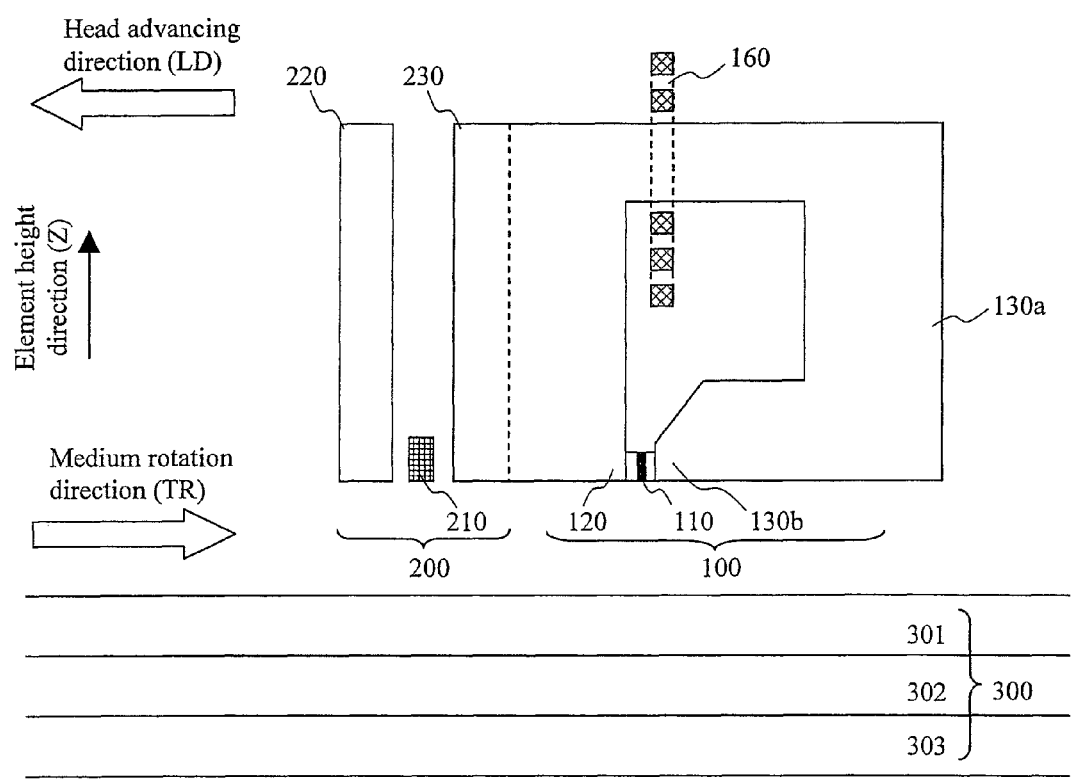
FIG. 1 illustrates a structural example of a magnetic recording apparatus according to a first embodiment.

Embodiments of the present invention will be explained below with reference to the accompanying drawings. The same parts or components are denoted by the same reference numerals for facilitating understanding.

First Embodiment

FIG. 1 illustrates a structural example of a magnetic recording apparatus according to a first embodiment of the present invention. A magnetic recording/reading head and its surrounding areas are schematically shown. Incidentally, it should be noted that, in the drawings, a scale of each part is not always the same as a scale of an actual head for illustrating an entire structure of the magnetic recording/reading head. The same can be said to other components.

The magnetic recording/reading head is a recording/reading separation head including a recording head section 100 and a reading head section 200.

The recording head section 100 includes an oscillator 110, a main pole 120, an auxiliary magnetic pole 130a, a trailing shield 130b, and a coil 160. The oscillator 110 generates a high frequency field. The main pole 120 generates a recording head magnetic field. The trailing shield 130b is provided to control a magnetization rotational direction of the oscillator 110. The coil 160 and the auxiliary magnetic pole 130a magnetize a magnetic field to the main pole 120.

The main pole 120 according to the first embodiment is made of $Fe_{70}Co_{30}$, and its saturated magnetization is 2.4 T. The trailing shield 130b is made of NiFe, and its saturated magnetization is 1.2 T. The materials for the main pole 120 and the trailing shield 130b are not particularly limited as long as they are magnetic materials. It is desirable that the saturated magnetization of the main pole 120 and the magnetic permeability of the trailing shield 130b are high for applying a large magnetic field to the oscillator 110.

The magnitude of the magnetic field applied from the main pole 120 to the oscillator 110 is increased as the distance (TG) between the main pole 120 and the trailing shield 130b is reduced. At the same time, the strength of the magnetic field applied to a magnetic recording medium 300 is reduced. Thus, TG needs to be appropriately set.

When the height (HT) of the trailing shield 130b is too high, the strength of the magnetic field applied to the magnetic recording medium 300 is reduced. On the contrary, when HT is too low, the trailing shield 130b is saturated and does not function properly. Thus, HT needs to be appropriately set. In the first embodiment, TG is 30 nm which usually corresponds to the film thickness of the oscillator 110. TH is 200 nm. TG will be explained in further detail later with reference to FIG. 2. The appropriate ranges of TG and HT will be also explained later.

Figure 4:
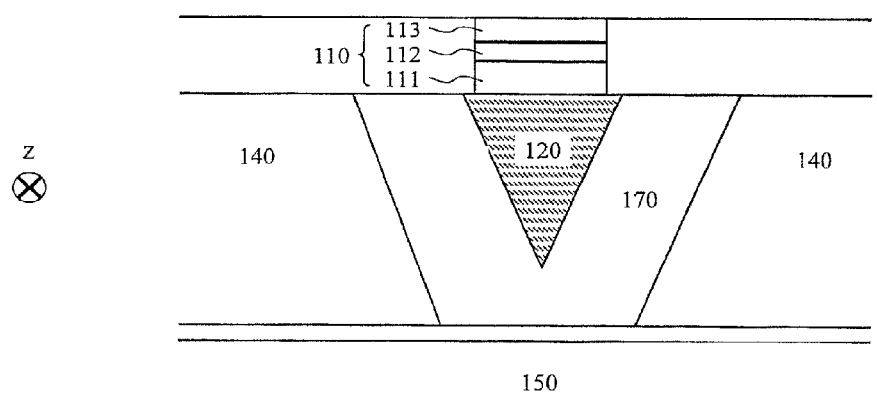
FIG. 4 is a detailed view of the magnetic recording/reading head as viewed from an upper side of a magnetic recording medium 300.
Figures 5, 6:
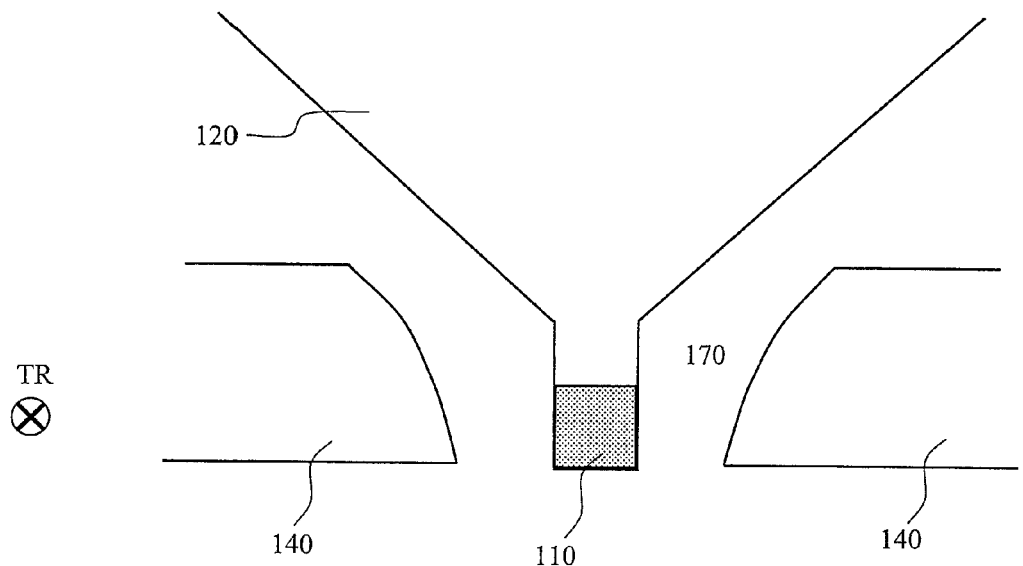
FIG. 5 is a detailed view of the magnetic recording/reading head as viewed in a trailing direction.
FIG. 6 is a chart for explaining effects of the first embodiment.

The advancing direction where the magnetic recording/reading head advances along the medium is referred to as a leading direction, and the direction opposite to the advancing direction of the magnetic recording/reading head along the medium is referred to as a trailing direction. A side shield 140 may be provided on the outer side of the main pole 120 in the track width direction as shown in FIGS. 4 and 5. The side shield 140 may be provided on both sides of the main pole 120 or either one of the outer side and inner side thereof.

The reading head section 200 includes a reading sensor 210, a lower magnetic shield 220, and an upper magnetic shield 230. The reading sensor 210 may have any structure as long as it can read a write signal. The reading sensor 210 may be configured to provide the giant magneto-resistive (GMR) effect, the tunneling magneto-resistive (TMR) effect, or the electro mechanical resonant (EMR) effect. The reading sensor 210 may be a differential reading sensor having two or more reading sensors to respond to an external magnetic field using the reverse polarity. The lower magnetic shield 220 and the upper magnetic shield 230 are important to improvement of the reading signal quality and are preferably provided. Although not illustrated in FIG. 1, the upper magnetic shield 230 can serve as an auxiliary magnetic pole of the recording head section 100.

The magnetic recording medium 300 includes a recording layer 301, an intermediate layer 302, and a soft magnetic under-layer 303 in this order from the side close to the magnetic recording/reading head.

The recording layer 301 according to the first embodiment is made of CoCrPt alloys and has the film thickness of 15 nm. A material for the recording layer 301 may be other than CoCrPt alloys, but preferably ensures the vertical magnetic anisotropy. The intermediate layer 302 is provided to prevent magnetic coupling between the recording layer 301 and the soft magnetic under-layer 303. The soft magnetic under-layer 303 improves a write field applied to the recording layer 301 from the main pole 120. Other layers may be added to the magnetic recording medium 300, which does not violate the spirit of the present invention.

The magnetic recording medium 300 may be a continuous medium containing continuous bits, or a discrete track medium provided with a nonmagnetic region, to which a recording head cannot write information, between a plurality of tracks. Further, the magnetic recording medium 300 may be a patterned medium containing protruded magnetic patterns and a nonmagnetic material filling recessed portions between the magnetic patterns on a substrate. Incidentally, the distance between the magnetic recording/reading head and the recording layer 301 is 5 nm according to the first embodiment.

Figure 2:
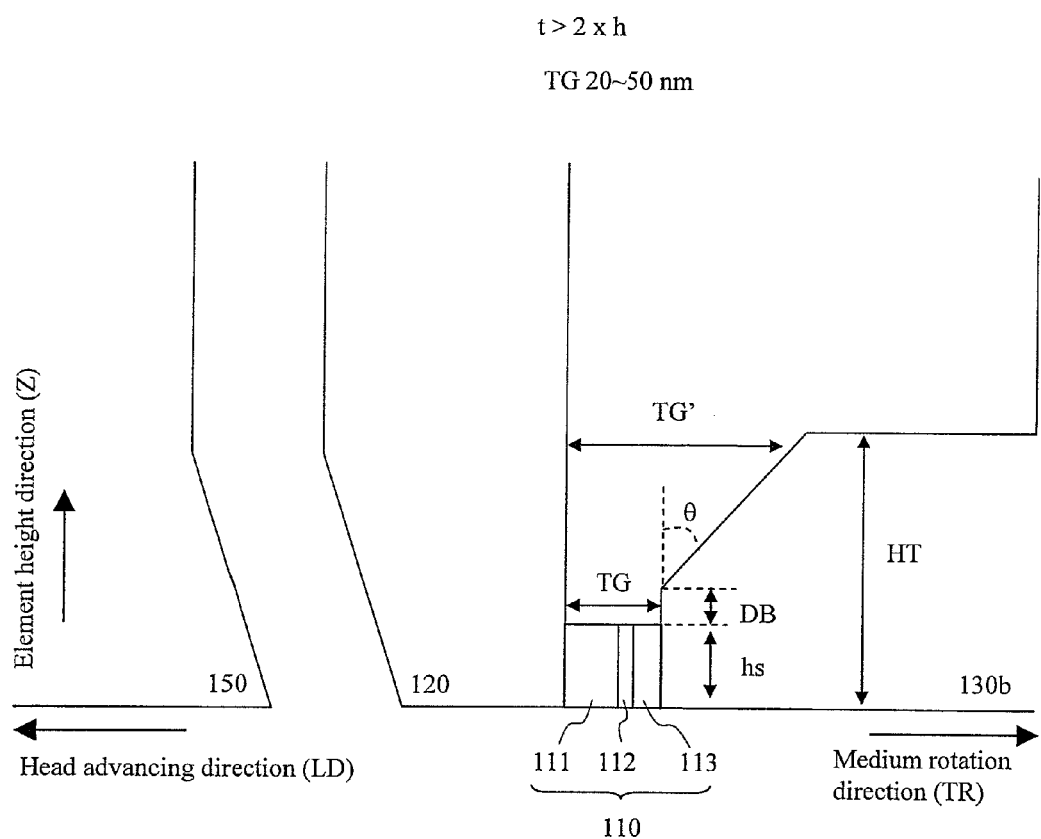
FIG. 2 is a detailed view of a magnetic recording/reading head as viewed in a cross-track direction.

FIG. 2 is a detailed view of the magnetic recording/reading head as viewed in the cross-track direction. The oscillator 110 includes an FGL 111, an intermediate layer 112, and a spin injection fixing layer 113. The FGL 111 generates a high frequency field. The intermediate layer 112 is made of a material having high spin permeability. The spin injection fixing layer 113 gives spin-torque to the FGL 111. The oscillator 110 may be provided by laminating the FGL 111, the intermediate layer 112, and the spin injection fixing layer 113 in this order from the side close to the main pole as shown in FIG. 2. Alternatively, the oscillator 110 may be provided by laminating the spin injection fixing layer 113, the intermediate layer 112, and the FGL 111 in this order from the side close to the main pole 120. Both of the track width and the element height of the oscillator 110 are 40 nm in the first embodiment.

A guide layer may be provided to be close to the FGL 111. The guide layer stabilizes the oscillation of the FGL 111. The guide layer may be made of Co/Ni and the like, having high vertical anisotropic energy.

The FGL 111 according to the first embodiment is made of $Fe_{70}Co_{30}$ and has the film thickness of 15 nm. $Fe_{70}Co_{30}$ indicates the saturated magnetization of 2.4 T and is capable of generating a strong high frequency field. A material for the FGL 111 may be any magnetic material. In addition to FeCo alloys, the material for the FGL 111 may include NiFe alloys, Heusler alloys such as CoFeGe, CoMnGe, CoFeAl, CoFeSi, CoMnSi, and CoFeSi, Re-TM amorphous alloys such as TbFeCo, and CoCr alloys. Further, the material for the FGL 111 may be CoIr that has negative vertical anisotropic energy. The spirit and scope of the present invention are not violated even when the film thickness of the FGL 111 is more than 15 nm or less than 15 nm, but it is preferable that the film thickness of the FGL 111 is 5 nm or more and 30 nm or less. The film thickness of the FGL 111 is preferably set to be 5 nm or more because the strength of the high frequency field is reduced too much when the film thickness is too thin. Also, the film thickness of the FGL 111 is preferably set to be 30 nm or less because the FGL 111 is divided into many magnetic sections and the strength of the magnetic field is reduced when the film thickness is too thick.

The intermediate layer 112 according to the first embodiment is made of Cu and has the film thickness of 3 nm. The preferable material for the intermediate layer 112 is nonmagnetic and conductive, and may include Au, Ag, Pt, Ta, Ir, Al, Si, Ge, and Ti.

The spin injection fixing layer 113 according to the first embodiment is made of Co/Pt. The vertically anisotropic magnetic field Hk of Co/Pt used in the first embodiment is 8 kOe. The use of a vertically anisotropic material for the spin injection fixing layer 113 stabilizes the oscillation of the FGL 111. In addition to Co/Pt, artificial magnetic materials such as Co/Ni, Co/Pd, and CoCrTa/Pd may be preferably used. The same materials as used for the FGL 111 may be also used even though the stability of oscillation is slightly reduced.

Since the oscillator 110 has the above-mentioned configuration, the strong high frequency field can be applied to the recording layer 301 of the magnetic recording medium 300. Although not illustrated in FIGS. 2 and 3, a seed layer or cap layer made of nonmagnetic materials may be provided between the oscillator 110 and the main pole 120 or between the oscillator 110 and the trailing shield 130b for ensuring magnetic characteristics of the oscillator 110.

The trailing shield 130b is inclined toward the trailing side from a position above the uppermost portion of the oscillator 110 in the element height direction. Accordingly, the distance (TG') between the main pole 120 and the trailing shield 130b at the upper portion of the oscillator 110 is longer than the distance (TG) between the main pole 120 and the trailing shield 130b on the air bearing surface.

When a distance between the uppermost portion of the oscillator 110 and the position where the trailing shield 130b starts to be inclined is referred to as DB, DB is 25 nm in the first embodiment. The angle ($\theta$) of inclination of the trailing shield 130b relative to a direction vertical to the magnetic recording medium 300 is 45 degrees. Specific advantageous effects brought by the above-mentioned configuration, ranges for obtaining the effects, and its reasons will be explained later.

Figure 3:
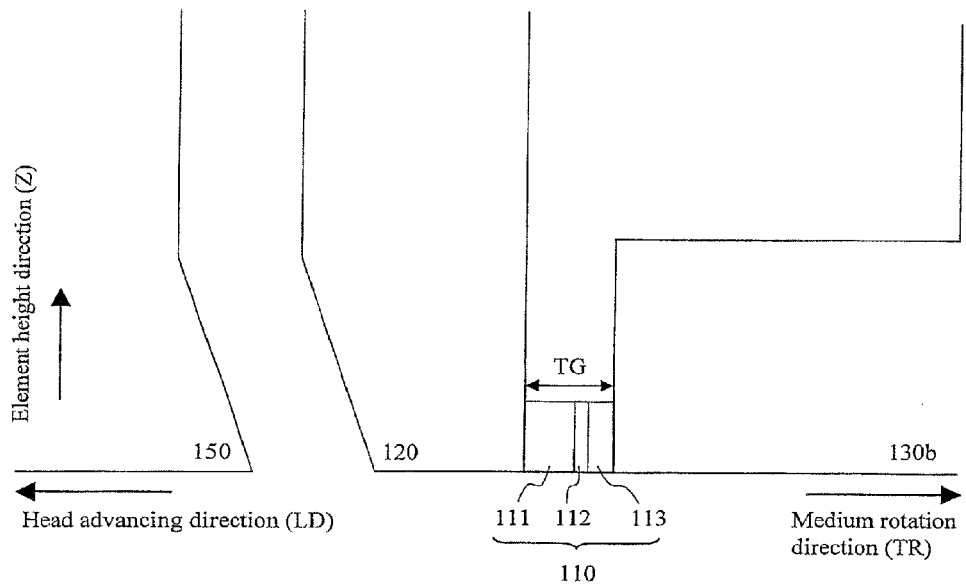
FIG. 3 is a detailed view of a magnetic recording/reading head according to a conventional art as viewed in a cross-track direction.

FIG. 3 is a detailed view of a magnetic recording/reading head according to a conventional art as viewed in the cross-track direction. In the conventional magnetic recording/reading head, the trailing shield 130b is not inclined and the surface facing the trailing shield 130b and the main pole 120 is formed to be substantially vertical ($\theta \approx 0°$) to the magnetic recording medium 300.

FIG. 4 is a detailed view of the magnetic recording/reading head as viewed from the upper side of the magnetic recording medium 300. The main pole 120 has the width of 45 nm in the cross-track direction, and the oscillator 110 has the width of 40 nm in the cross-track direction. The width of the main pole 120 and the width of the oscillator 110 in the cross-track direction are not limited thereto, but it is preferable that they are narrow for recording a high surface recording density pattern. A leading tapered structure, in which a leading end of the main pole 120 is tapered toward a leading side, is adopted in the first embodiment. The leading tapered structure increases the strength of the magnetic field generated from the main pole 120 toward the oscillator 110 and the magnetic recording medium 300. The spirit of the present invention is not violated even when the leading tapered structure is not adopted.

A leading shield 150 is provided on the leading side of the main pole 120. The leading shield 150 according to the first embodiment is made of NiFe. The leading shield 150 prevents the magnetic field generated from the leading taper (which will be explained in detail later with reference to FIG. 5) of the main pole 120 from widening toward the leading side of the main pole 120, and prevents removal of information of adjacent tracks. It is preferable that the material for the leading shield 150 has high magnetic permeability as well as the trailing shield 130b. The spirit of the present invention is not violated even when the leading shield 150 is not provided irrespective of the leading tapered structure.

A side shield 140 is provided on both ends of the main pole 120 in the track width direction. The side shield 140 prevents the magnetic field generated from the main pole 120 from widening in the track width direction. However, the side shield 140 is not necessarily provided because the strength of the magnetic field applied from the main pole 120 to the magnetic recording medium 300 and the oscillator 110 is attenuated by providing the side shields 140. Alternatively, the side shield 140 may be provided on only one side of the main pole 120 in the track width direction. It is preferable that the material for the side shield 140 has high magnetic permeability as well as the trailing shield 130b. The side shield 140 according to the first embodiment is made of NiFe. The shape of the side shield 140 may be appropriately set.

A nonmagnetic layer 170 is provided between the main pole 120 and the side shield 140. The nonmagnetic layer 170 according to the first embodiment is made of Ru. By appropriately setting the film thickness of the nonmagnetic layer 170, the content of flux flowing from the main pole 120 to the side shield 140 and the content of flux flowing from the main pole 120 to the trailing shield 130b can be controlled. The film thickness of the nonmagnetic layer 170 according to the first embodiment, which is formed between the main pole 120 and the side shield 140, is 100 nm, but the spirit of the present invention is not violated even when the film thickness of the nonmagnetic layer 170 is not 100 nm.

FIG. 5 is a detailed view of the magnetic recording/reading head as viewed in the trailing direction. The side shield 140 is provided on both ends of the main pole 120 in the track width direction. The nonmagnetic layer 170 is provided between the main pole 120 and the side shield 140.

The magnetic recording apparatus according to the first embodiment is explained above. Then, the advantageous effects brought by the present invention will be explained below.

FIG. 6 is a chart for explaining the effects brought by the first embodiment of the present invention. FIG. 6 illustrates the strength of the magnetic field (Hgap) applied to the FGL 111 from the main pole 120 and the strength of the magnetic field (Hme) applied to the recording layer 301 of the magnetic recording medium 300 from the main pole 120 in the magnetic recording head according to the first embodiment and in the conventional magnetic recording head as shown in FIG. 3.

Hgap and Hme are 10.0 kOe in the conventional structure, while Hgap is 11.5 kOe and Hme is 11.0 kOe in the first embodiment. Thus, it is confirmed that both Hgap and Hme are improved in the magnetic recording head structure according to the first embodiment as compared to the conventional structure.

Figure 7:
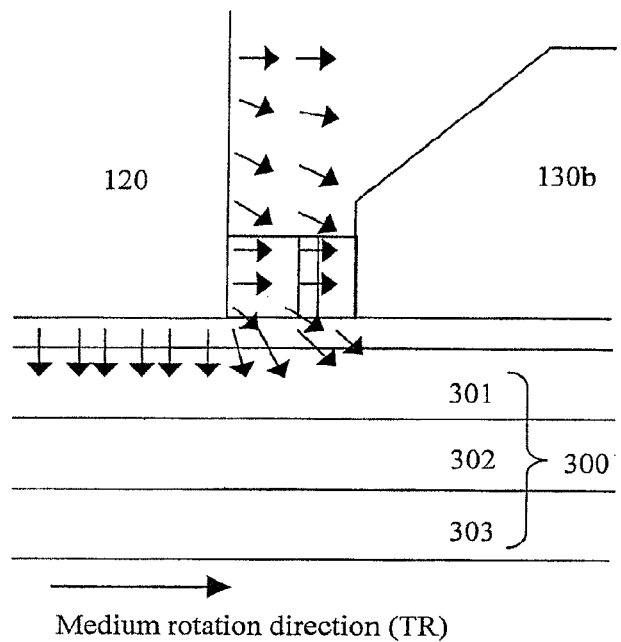
FIG. 7 illustrates distribution of flux generated from a main pole 120.
Figure 7:
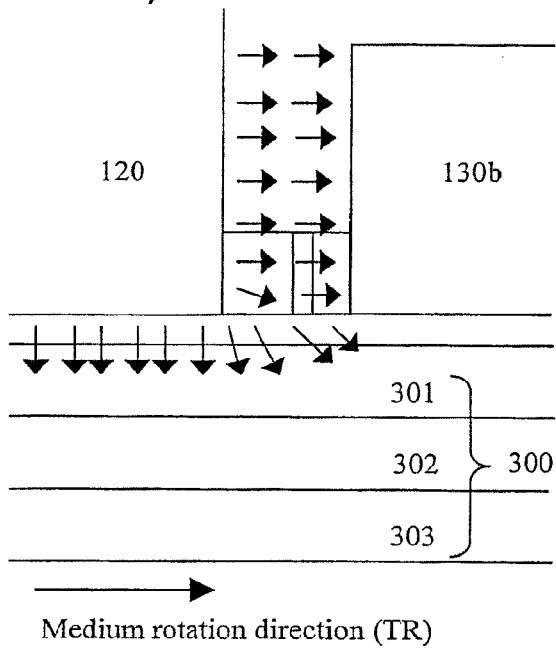

FIG. 7 illustrates the distribution of flux generated from the main pole 120. FIG. 7(a) illustrates the distribution of flux according to the first embodiment, and FIG. 7(b) illustrates the distribution of flux according to the conventional structure. With either structure, the flux generated from the main pole 120 flows toward the trailing shield 130b and the soft magnetic under-layer 303. It is because the trailing shield 130b and the soft magnetic under-layer 303 have the high magnetic permeability as mentioned above.

The flux is concentrated in the oscillator 110 and the recording layer 301 just under the oscillator 110 in the structure according to the first embodiment, but the flux density is low at the upper side of the oscillator 110. On the other hand, the flux density is uniform at every position in the conventional structure.

In the structure according to the first embodiment, the interval (TG) between the main pole 120 and the trailing shield 130b at the same height as the oscillator 110 is narrow, and TG at the position above the oscillator 110 is wide. Accordingly, the flux is concentrated around the oscillator 110 where TG is narrow.

Since the strength of the magnetic field is increased as the flux density is increased, the magnetic field generated from the main pole 120 is concentrated on the oscillator 110 and the strength of the magnetic field applied from the main pole 120 to the oscillator 110 and the recording layer 301 is increased in the first embodiment as compared to the conventional structure.

Desirable ranges of a starting point (DB) of inclination of the trailing shield 130b and an inclination angle (θ) thereof will be explained below.

Figure 8:
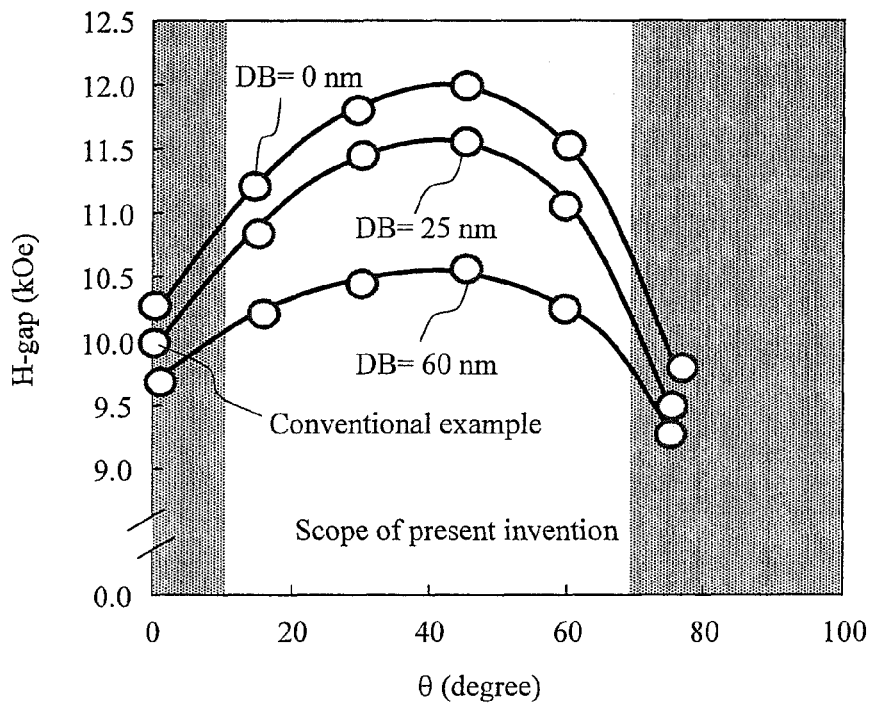
FIG. 8 illustrates change of Hgap when θ is changed.

FIG. 8 illustrates the change of Hgap when θ is changed. Hgap is increased as θ is increased from 0 degree and then decreased when θ becomes 60 degrees or more as shown in FIG. 8. As θ is increased, the magnetic flux generated above the oscillator 110 of the main pole 120 is drawn to the lower portion of the trailing shield 130b where the distance between the main pole 120 and the trailing shield 130b is short. When θ becomes too large, however, such phenomenon ends and the magnetic permeability of the trailing shield 130b is reduced. Accordingly, it is desirable that θ is increased without ending the phenomenon.

It is found from FIG. 8 that θ, which is suitable for sufficiently obtaining the advantageous effects of the first embodiment, ranges from 10 degrees to 70 degrees. As described in detail later, DB desirably ranges from 0 nm to 100 nm. At this time, the optimal θ ranges from 10 degrees to 70 degrees. It can be confirmed from FIG. 8 that Hgap is increased when θ is in the above-mentioned range under all conditions that DB is 0 nm, 25 nm, and 60 nm.

Figure 9:
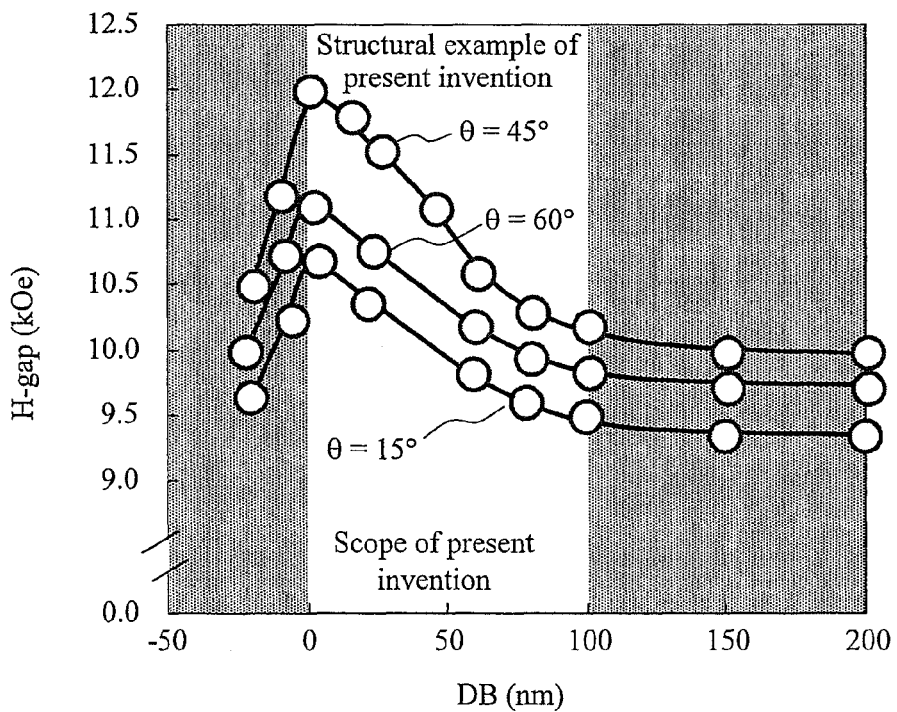
FIG. 9 illustrates change of Hgap when DB is changed.

FIG. 9 illustrates the change of Hgap when DB is changed. Hgap reaches a maximum value when DB is 0. Hgap is rapidly decreased when DB is reduced from 0 nm, and moderately decreased when DB is increased from 0 nm. Since TG is effectively widened at the position where the oscillator 110 is provided when DB is less than 0 nm, the magnetic flux does not flow toward the trailing shield 130b and flows toward the recording layer 301. On the other hand, when DB is more than 0 nm, the magnetic flux generated above the oscillator 110 of the main pole 120 does not easily flow downwardly.

As obvious from FIG. 9, DB, which is suitable for obtaining the advantageous effects of the first embodiment, ranges from 0 nm to 100 nm. Such a range does not change when θ is 10 degrees or more and 70 degrees or less. It can be confirmed from FIG. 9 that Hgap is increased when DB is in the above-mentioned range under all conditions that θ is 15 degrees, 45 degrees, and 60 degrees.

Figure 10:
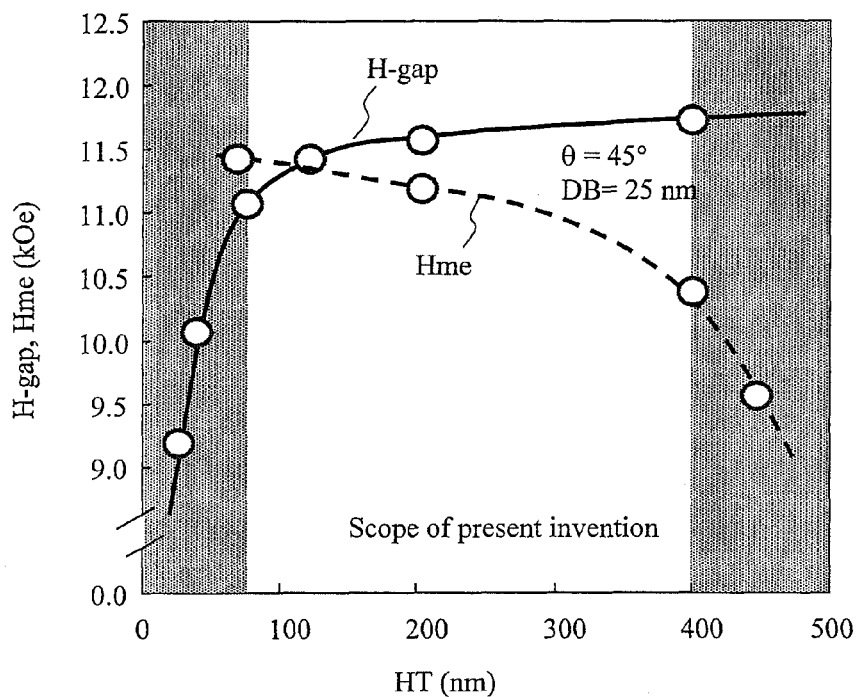
FIG. 10 illustrates changes of Hgap and Hme when HT is changed.

Then, the range of the height (HT) of the trailing shield 130b and the distance (TG) between the trailing shield 130b and the oscillator 110, which are suitable for obtaining the advantageous effects brought by the present invention, will be explained below. HT preferably ranges from 80 nm to 400 nm. FIG. 10 illustrates a relationship between Hgap, Hme, and HT. In FIG. 10, θ is 45 degrees and DB is 25 nm. As obvious from FIG. 10, Hgap is decreased when HT is less than 80 nm and Hme is decreased when HT is 400 nm or more. When HT is too small, the effect brought by the trailing shield 130b is reduced and the sufficient Hgap cannot be obtained. When HT is too large, the magnetic flux flowing from the main pole 120 to the trailing shield 130b at the upper side of the oscillator 110 becomes too large and thus Hme is reduced.

Figure 11:
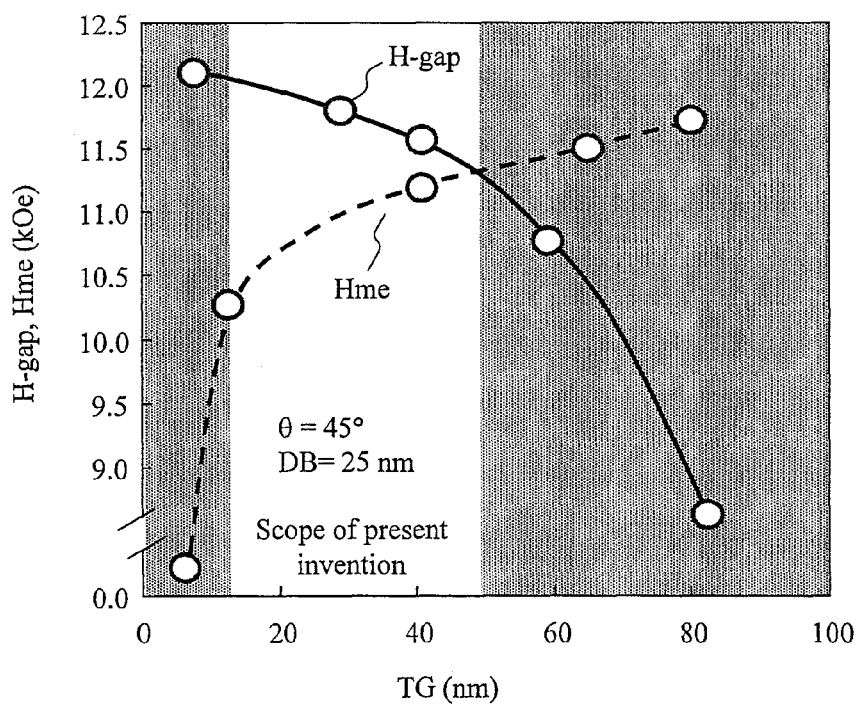
FIG. 11 illustrates changes of Hgap and Hme when TG is changed.

FIG. 11 illustrates a relationship between Hgap, Hme, and TG. As obvious from FIG. 11, Hme is rapidly decreased when TG is 15 nm or less. Hgap is rapidly decreased when TG is 50 nm or more. Accordingly, TG preferably ranges from 15 nm to 50 nm.

When the trailing shield 130b is provided so that HT ranges from 80 nm to 400 nm, TG ranges from 15 nm to 50 nm, θ ranges from 10 degrees to 70 degrees, and DB ranges from 0 nm to 100 nm, a high magnetic field can be applied to both the oscillator 110 and the magnetic recording medium 300.

First Embodiment

Summary

The magnetic recording/reading head according to the first embodiment has a portion above the upper end portion of the oscillator 110, where the interval between the main pole 120 and the trailing shield 130b is larger than the interval between the main pole 120 and the trailing shield 130b on the air bearing surface. Thus, the magnetic flux generated from the main pole 120 can be concentrated on the oscillator 110, so that the magnetic recording effect can be improved.

Incidentally, in the first embodiment, the trailing shield 130b is not necessarily inclined as long as the interval TG' is larger than the interval TG. For example, the trailing shield 130b may be shaped in a staircase pattern without being inclined as shown in FIG. 2. The same is applied to other embodiments explained below.

Second Embodiment

Figure 12:
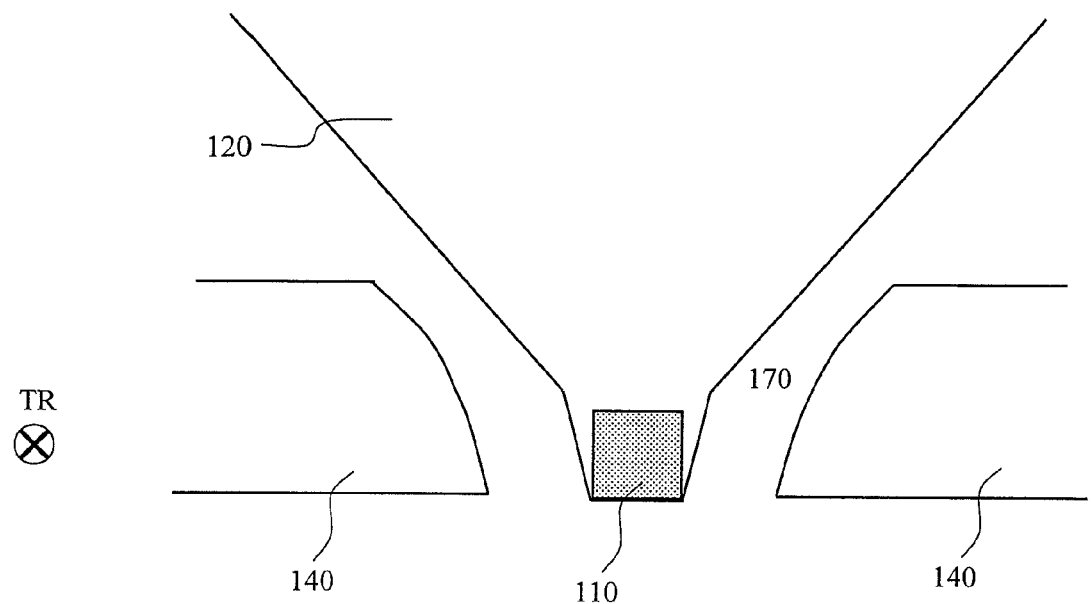
FIG. 12 is a detailed view of a magnetic recording/reading head according to a second embodiment as viewed in a trailing direction.

FIG. 12 is a detailed view of a magnetic recording/reading head according to a second embodiment as viewed in the trailing direction. In the second embodiment, the shape of the main pole 120 of the recording head section 100 is different from that in the first embodiment. Other structures are the same as in the first embodiment.

In the second embodiment, the track width of the main pole 120 is increased from the air bearing surface toward the upper side. In the second embodiment, the track width of the main pole 120 on the air bearing surface is 40 nm as in the first embodiment, but is 60 nm at the uppermost portion of the oscillator 110.

Since the track width of the upper portion of the main pole 120 is large in the second embodiment, the strength of the magnetic field applied to the oscillator 110 can be improved while preventing the write field from widening in the track width direction.

Third Embodiment

Figure 13:
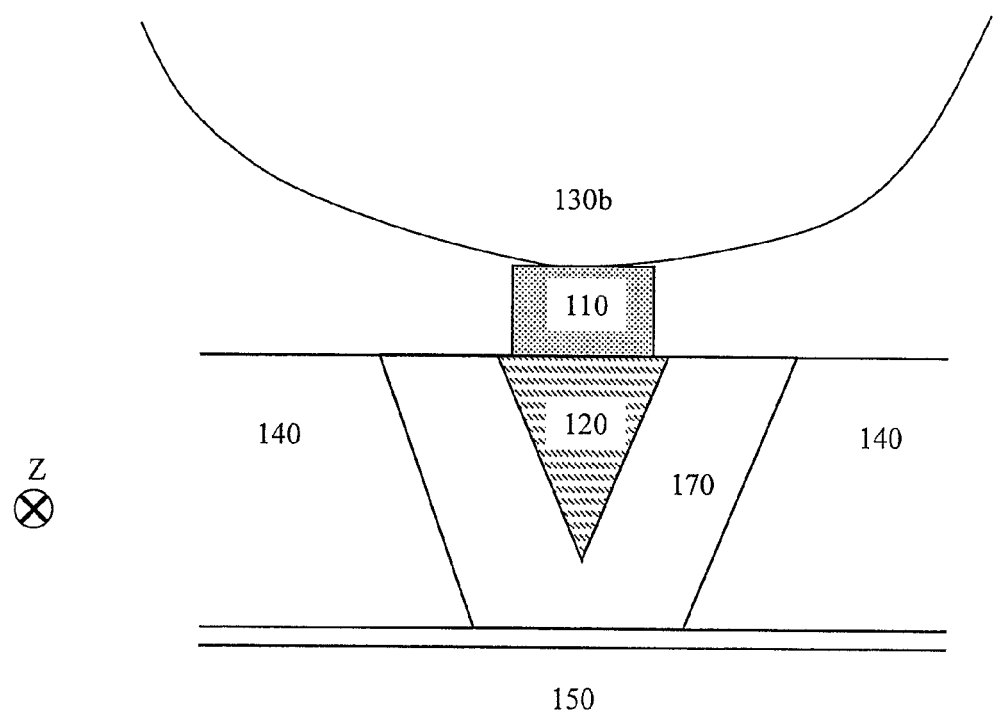
FIG. 13 is a detailed view of a magnetic recording/reading head according to a third embodiment as viewed from the upper side of the magnetic recording medium 300.

FIG. 13 is a detailed view of a magnetic recording/reading head according to a third embodiment as viewed from the upper side of the magnetic recording medium 300. In the third embodiment, only the shape of the trailing shield 130b of the recording head section 100 is different from that in the first embodiment. Other structures are the same as in the first embodiment.

In the third embodiment, the end portions of the trailing shield 130b in the track width direction are curved in the trailing direction. The curve is increased from the center toward the ends in the track width direction.

Since the trailing shield 130b is curved toward the trailing sides in the third embodiment, the magnetic field generated from the main pole 120 is easily concentrated on the center in the track width direction (where the oscillator 110 is provided), so that the strength of the magnetic field applied to the oscillator 110 can be improved. The magnetic field can be further effectively concentrated on the oscillator 110 by combining the structures according to the second embodiment and the third embodiment.

Fourth Embodiment

Figure 14:
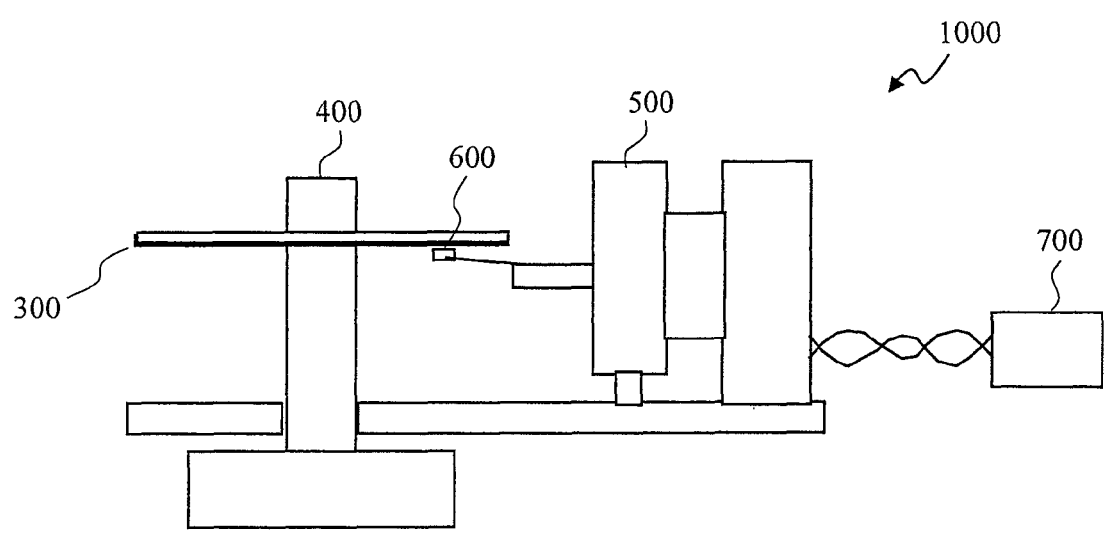
FIG. 14 illustrates a structural example of a magnetic recording/reading apparatus 1000 according to a fourth embodiment.

FIG. 14 illustrates a structural example of a magnetic recording/reading apparatus 1000 according to a fourth embodiment of the present invention. The magnetic recording/reading head according to either one of the first to third embodiments is mounted on a head slider 600.

The magnetic recording/reading apparatus 1000 rotates the magnetic recording medium 300 with a spindle motor 400, and induces the head slider 600 to the track of the magnetic recording medium 300 by the actuator 500. A reading head and a recording head provided on the head slider 600 come close to a predetermined recording position on the magnetic recording medium 300 by such a mechanism to relatively move and sequentially write or read a signal. The actuator 500 is preferably a rotary actuator.

A write signal is recorded on the magnetic recording medium 300 by a recording head via a signal processing system 700. In the signal processing system 700, the output of the reading head is obtained as a signal. When the reading head is moved to a desired recording track, the signal processing system 700 detects the position on the track using a highly-sensitive output from the reading head and controls the actuator 500 to determine the position of the head slider 600.

Although only one head slider 600 and one magnetic recording medium 300 are illustrated in FIG. 14, but the number thereof may be more than one. The magnetic recording medium 300 may have recording information on both sides in recording information. When information is recorded on both sides of the disk, the head slider 600 is provided on both sides of the magnetic recording medium 300.

DESCRIPTION OF SYMBOLS

100: recording head section, 110: oscillator, 111: field generation layer (FGL), 112: intermediate layer, 113: spin injection fixing layer, 120: main pole, 130a: auxiliary magnetic pole, 130b: trailing shield, 140: side shield, 150: leading shield, 160: coil, 170: nonmagnetic layer, 200: reading head section, 210: reading sensor, 220: lower magnetic shield, 230: upper magnetic shield, 300: magnetic recording medium, 301: recording layer, 302: intermediate layer, 303: soft magnetic under-layer, 400: spindle motor, 500: actuator, 600: head slider, 700: signal processing system, 1000: magnetic recording/reading apparatus

What is claimed is:
1. A magnetic recording head, comprising:
a main pole that generates a magnetic field;
a trailing shield provided on a trailing side of the main pole; and
an oscillator provided between the main pole and the trailing shield for generating a high frequency field, wherein
the magnetic recording head includes a portion in which an interval between the main pole and the trailing shield at a place in a position above an upper end portion of the oscillator and within a height from a bearing surface of the trailing shield as a reference height, the height is in a vicinity of a surface of the trailing shield opposing to the main pole, is larger than an interval between the main pole and the trailing shield on an air bearing surface;
wherein the trailing shield has a surface facing the main pole, and a surface inclined and tapered at the place;
wherein the surface facing the main pole is perpendicular to the air bearing surface such that the inclined surface intersects the perpendicular surface at the place; and
wherein the inclined surface inclined away from the oscillator and connected directly to the surface facing the main pole.

2. The magnetic recording head according to claim 1, wherein
the interval between the main pole and the trailing shield on the air bearing surface is 15 nm or more and 50 nm or less and the height of the trailing shield is 80 nm or more and 400 nm or less,
an end portion of the inclined surface on a side close to the air bearing surface is separated from an upper end portion of the oscillator in the element height direction by 100 nm or less, and an angle of the inclined surface is 10 degrees or more and 70 degrees or less when an angle of a non-inclined surface is 0 degrees.

3. The magnetic recording head according to claim 1, wherein a track width of the main pole is increased from the air bearing surface toward an upper side.

4. The magnetic recording head according to claim 1, wherein an end portion of the trailing shield in a track width direction is curved, and an interval between the main pole and the trailing shield at the end portion is larger than an interval between the main pole and the trailing shield at a central position of the trailing shield in the track width direction.

5. A magnetic recording apparatus, comprising:
the magnetic recording head according to claim 1,
a magnetic recording medium in which the magnetic recording head records information, and
a signal processor that processes a signal read by the magnetic recording head.

* * * * *